Sept. 30, 1958      E. C. SCHMIDT      2,854,086
PROTECTIVE SCREEN DEVICE FOR AUTOMOBILE ENGINES
Filed Nov. 26, 1956      2 Sheets-Sheet 1
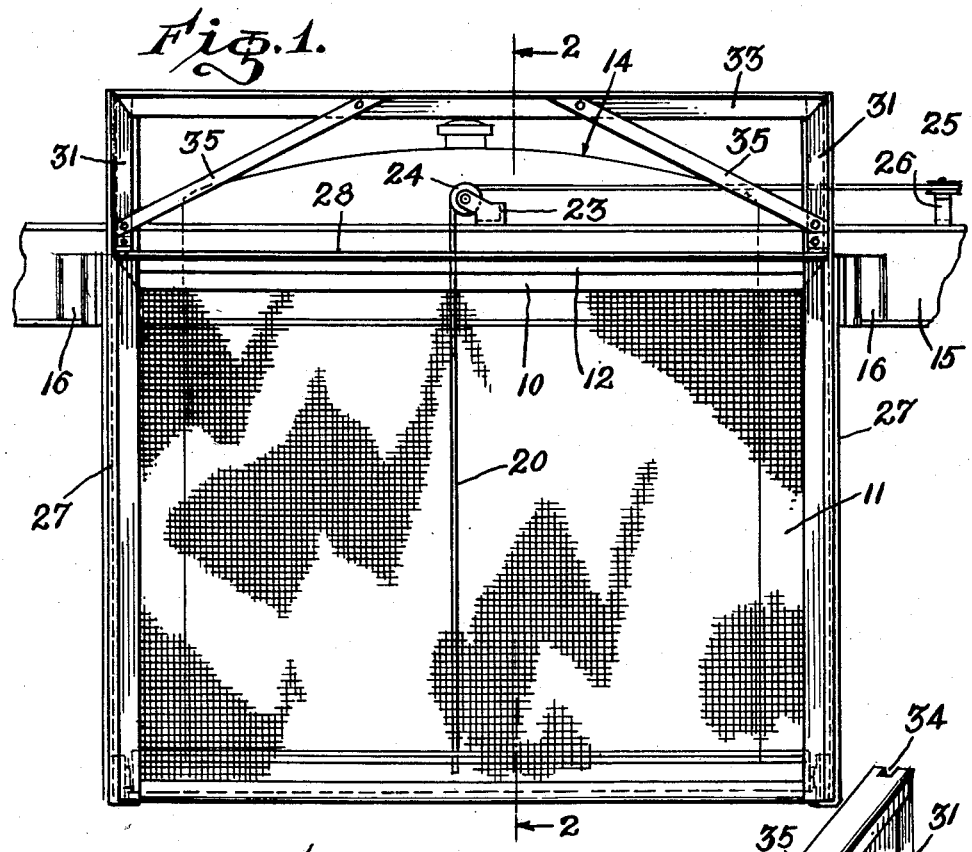
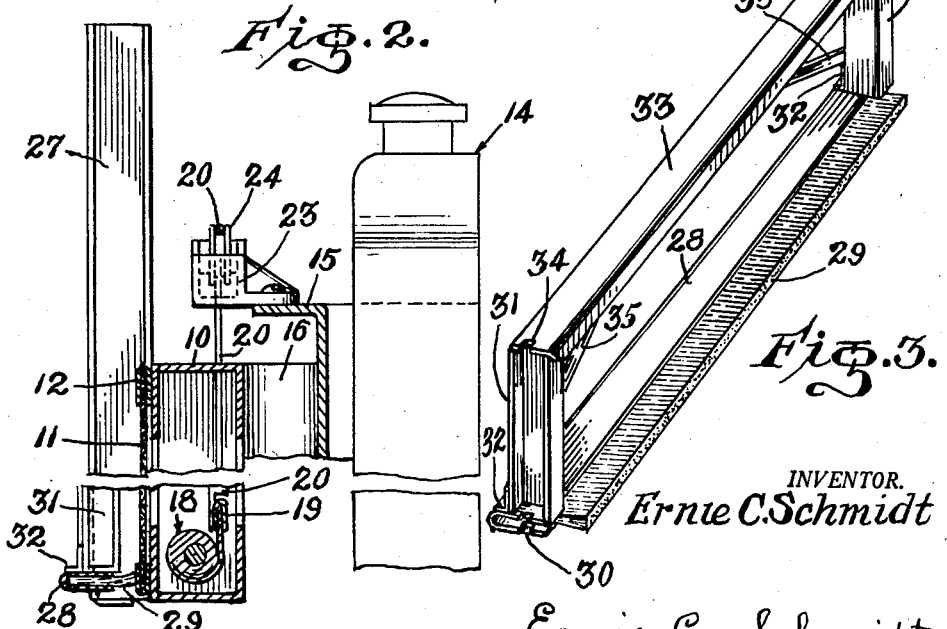
INVENTOR.
Ernie C. Schmidt Sept. 30, 1958  E. C. SCHMIDT  2,854,086
PROTECTIVE SCREEN DEVICE FOR AUTOMOBILE ENGINES
Filed Nov. 26, 1956  2 Sheets-Sheet 2
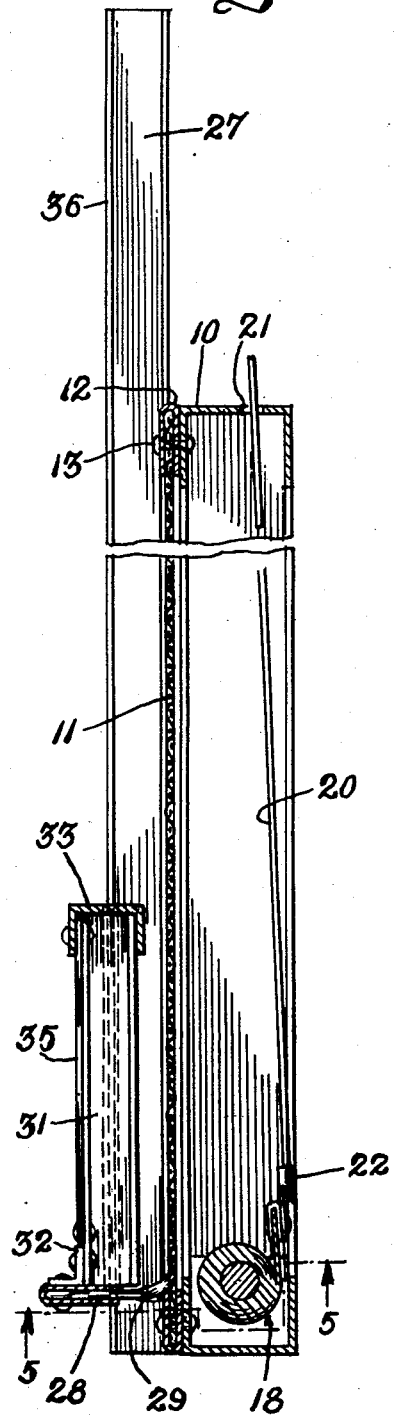
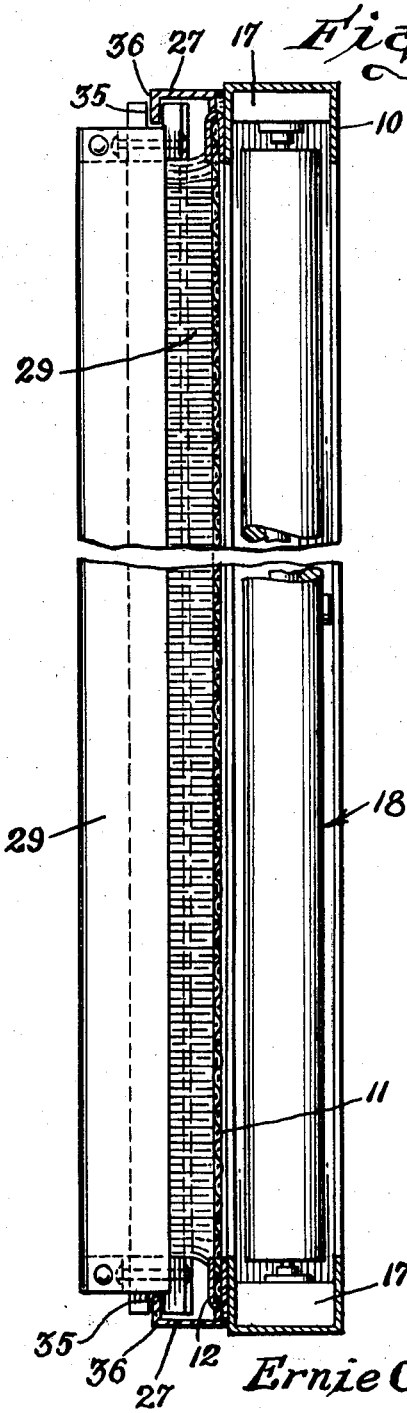
INVENTOR.
Ernie C. Schmidt

United States Patent Office 2,854,086
Patented Sept. 30, 1958

2,854,086

PROTECTIVE SCREEN DEVICE FOR AUTOMOBILE ENGINES

Ernie C. Schmidt, Spokane, Wash.

Application November 26, 1956, Serial No. 624,363

2 Claims. (Cl. 180—68)

The invention relates to protective screen devices for automobile engines.

It is an object of the present invention to provide a protective screen device for automobile engines which is positioned between the grill work of the automobile and the engine and which will prevent insects and dirt from passing rearwardly through the grill onto the engine.

It is another object of the present invention to provide a protective screen device of the above type which includes a roller shade operable from the dashboard of the car which can be raised to close off the screen and to help warm the car engine during cold weather.

It is still another object of the present invention to provide a protective screen device of the above type which includes a pair of vertical tracks at opposite sides within which ride the opposite ends of a brush which may be moved up and down to clean the screen and to remove insects and bugs or the like which accumulate thereon.

Other objects of the invention are to provide a protective screen for automobile engines bearing the above objects in mind which is of simple construction, has a minimum number of parts, is inexpensive to manufacture and efficient in operation and use.

For other objects and for a better understanding of the invention reference may be had to the following detailed description taken in connection with the accompanying drawing, in which:

Figure 1 is a front elevational view of a preferred embodiment of the present invention shown in operative use;

Fig. 2 is a vertical sectional view thereof taken along the line 2—2 of Fig. 1;

Fig. 3 is a perspective view shown alone of the brush forming a part of the invention;

Fig. 4 is a vertical sectional view of the invention in its entirety and illustrating the shade and brush forming a part of the invention; and Fig. 5 is a horizontal sectional view taken along the line 5—5 of Fig. 4.

Referring now more in detail to the drawing, 10 represents a rectangular frame of U-shaped cross section, substantially as illustrated.

A rectangular screen 11 is adapted to close off the outer face of the frame 10 and is provided around its periphery with the U-shaped frame 12, the screen 11 and the frame 12 thereof being secured to the frame 10 by means of the fastening means 13.

The frame 10 is mounted behind the automobile grill in front of the engine indicated generally at 14 on the usual transverse beam 15 by means of the brackets 16, as will be obvious.

A pair of wood reinforcement blocks 17 (Fig. 5) are fixedly mounted in the bottom of the frame 10 at the opposite ends thereof and serve to mount therebetween a roller shade indicated generally at 18 of a conventional construction, the free edge of the shade 18 being provided with the reinforced edge 19. The shade cord 20 extends upwardly through an opening 21 provided in the top of the frame 10, being connected at its lower end to the free end of the shade by means of the pivoted hook member 22.

A bracket 23 is fixedly mounted on the beam 15 and rotatably mounts the pulley 24 around which the shade and cord 20 passes laterally and around the horizontal pulley 25 mounted at one end of the beam 15 for rotation about a vertical axis by means of the bracket 26, the cord 25 then extending rearwardly to a suitable controlling or actuating member, not shown, mounted on the dashboard of the car and permitting the shade and roller to be operated in that manner. Thus, the shade 18 may be raised to close off the screen 11 to assist in starting the car during cold weather and to keep out the rain.

Means are provided for brushing the screen 11 free of insects and dirt at periodic intervals and include a pair of channel-shaped members 27 of U-shaped cross section secured to opposite sides of the frame 10 at the front thereof, the upper ends of the tracks 27 extending upwardly above the top of the frame 10. The inner flanges of the members 27 are cut away to provide clearance for the screen frame 12 and are secured at these portions to the frame 10. Any other suitable construction may, of course, be employed.

A brush (Fig. 3) of special design is provided and includes a base portion 28 of U-shaped cross section intermediate the sides of which are mounted the rearwardly extending bristles 29, the ends of the base member 29 extending laterally beyond the ends of the bristles and being provided with the vertically aligned notches 30. A pair of channel-shaped end members 31 are secured to the ends of the base member 29 by means of the angle brackets 32 (Fig. 3) and fixedly mount at their upper ends the opposite ends of the top member or handle 33 of U-shaped cross section, the opposite ends of the handle 33 being provided with notches 34 aligned vertically with the notches 30 at the bottom. Reinforcing braces 35 connect the top handle 33 with the end members 31. The brushes are placed downwardly onto the upper end of the tracks 27 with the forward flanges 36 of the tracks 27 being received within the notches or grooves 30, 34 to thus permit the vertical movement of the brush and to guide the same with a minimum of effort. It will be noted that in this position the bristles 29 will engage the screen 11 to clean the latter at periodic intervals. The brush may be removed from the tracks 27 by merely moving the same upwardly and off of the upper ends thereof.

In operation, the screen 11 will prevent bugs and insects and dirt from reaching the engine 14 through the grill when the car is in motion whereby to protect the same. The shade 18 may be raised from the dashboard by means of the pulleys 25, 24 and the string 20 to close off the screen and help to warm the motor during cold weather and to prevent rain from passing rearwardly through the screen. At periodic intervals, the screen 11 may be cleaned by the bristles 29 of the especially designed brush in an efficient and thorough manner, the brush moving within the tracks 27 and in a vertical direction and will be retained at the top of the tracks 27 when not in use, the bristles 29 supporting the brush on the top of the frame 10 (Fig. 4).

While various changes may be made in the detail construction, it shall be understood that such changes shall be within the spirit and scope of the present invention as defined by the appended claims.

What I claim as new and desire to protect by Letters Patent of the United States is:

1. A protective device for automobile engines comprising, in combination, a frame member, means for mounting said frame member intermediate the front end of an automobile engine and the automobile grill, a screen secured across said frame blocking the passage of insects rearwardly into association with said engine; brush means for cleaning said screen at periodic intervals; and track means mounted at the sides of said frame extending upwardly thereabove guiding the ends of said brush means and for supporting said brush means above the screen when not in use; said brush means comprising an elongated base member; rearwardly extending bristles mounted on said base member in contact with said screen; a U-shaped frame extending upwardly from and connected to the ends of said base member; said frame and base member at opposite ends having vertically aligned slots; said track means comprising a pair of channel shaped members having their rear flanges secured to said frame and their front flanges received within said grooves for guiding said brush means; said channel shaped members extending upwardly above the top of said frame, and said U-shaped frame serving as a handle for said brush means.

2. A device according to claim 1, said mounting means for said first frame comprising a pair of brackets mounted on opposite sides thereof and fixedly connected to a transverse beam in front of the engine.

References Cited in the file of this patent

UNITED STATES PATENTS

| | | |
|---|---|---|
| 1,399,859 | Garver | Dec. 13, 1921 |
| 1,443,465 | Fulton | Jan. 30, 1923 |
| 2,246,823 | Vollberg et al. | June 24, 1941 |

FOREIGN PATENTS

| | | |
|---|---|---|
| 461,527 | Germany | June 20, 1928 |
| 139,171 | Switzerland | June 16, 1930 |

OTHER REFERENCES

Science Illustrated Publication, October 1948, page 76 relied on. "All-Year Auto Screen Bars Bugs or Cold."